8152X
W. Jones,
Making Puddlers' Balls,
Patented Apr. 18, 1834
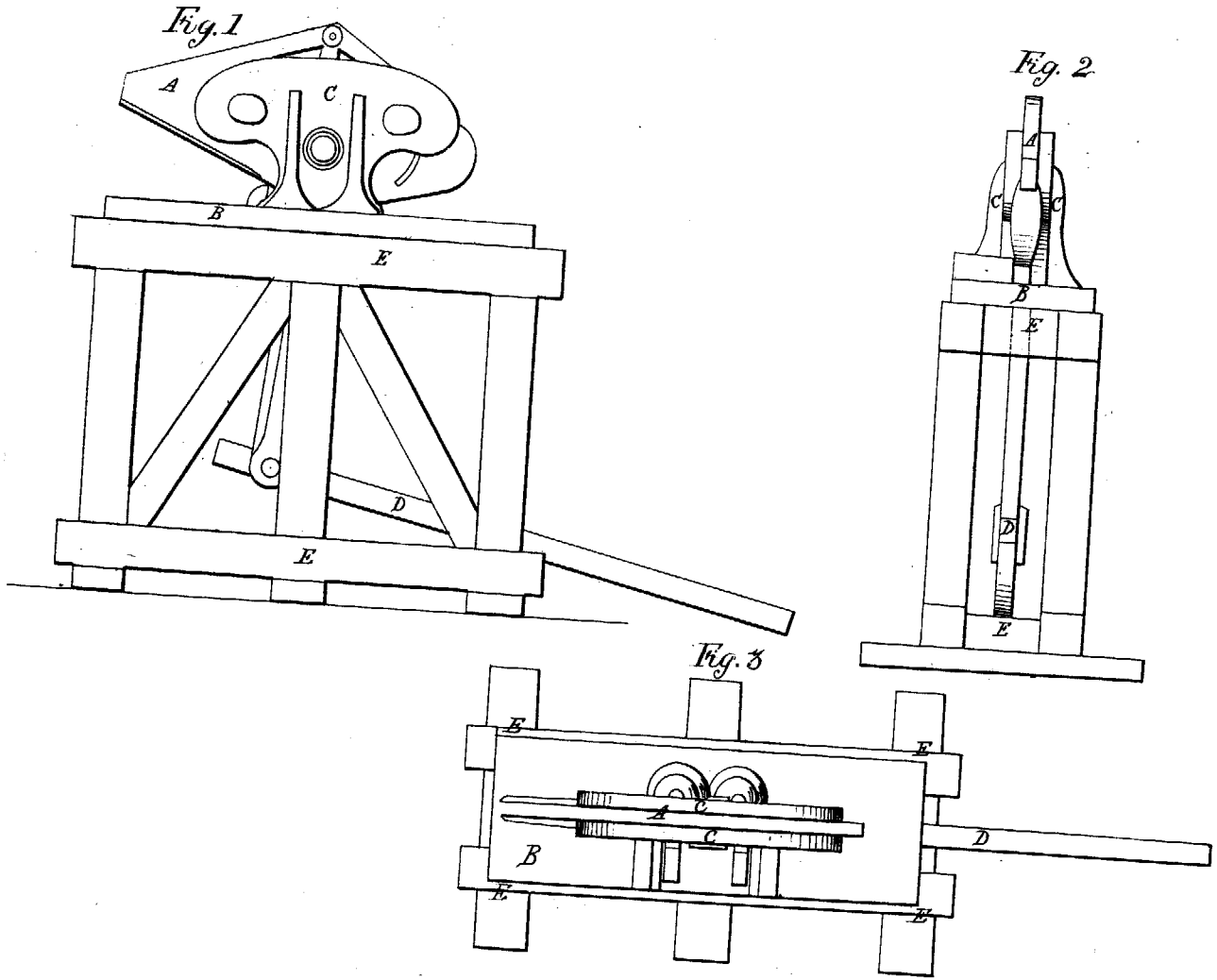
N. PETERS, PHOTO-LITHOGRAPHER, WASHINGTON, D. C.

William Jones. Haverstraw Rockland Co. N.Y.

Letters Patent:

The Schedule referred to in these Letters Patent and making
part of the same containing a discription in the words of the said
William Jones himself of his improvement in the machine
for pressing out Puddlers Balls & other iron instead of ham
mering the same out To all to Whom these presents shall come.
Be it known that I William Jones of Haverstraw in the coun
ty of Rockland and State of New York have invented a new &
useful machine — for pressing out Puddlers Balls & other Iron
instead of hammering the same out and that the following is a full
and exact description of said Machine as invented by me
Viz — The Machine consists of a beam of cast Iron called the
squeezer moving on a pivot by means of a lever & crank & a cast
iron bed on which the iron and Balls to be pressed out are pla
ced — The squeezer is of a triangular form and may be
single or double resembling two triangles joined at their ba
ses — Thro' the centre of the squeezer passes a pin of wrought
iron on which the squeezer turns — This pin rests on two iron
supporters pressing upon each side of the squeezer. the tops of
the supporters being of an oval form extending along the sides
of the squeezer to prevent racking — one of the supporters is
cast solid with the bed plate. the other is removable at pleasure
being fastened between two [illegible] attached to the bed plate by
means of wedges — The bed consists of a cast iron plate of
about four inches thickness — The squeezer is moved in various
ways. the most simple is by means of a lever to the end of
which is attached a connecting rod passing diagonally to a
crank placed at a convenient distance. The entire machine Drawing

8152X is supported on a strong frame made of wood or iron about six feet in height. When at rest the space at the mouth or end of the machine between the squeezer and the bed is about 15 inches & at the throat about four inches The iron or Balls to be pressed out are placed on the bed at the mouth of the Press & gradually pushed forward towards the center or throat at each revolution of the crank The pressure varies from four to five inches at each revolution & may be increased or diminished at pleasure Witnesses
+ b. N. B. Blunt } William Jones
h.f.11. John Gray }

418 wds (Granted April 18. 1834.)